United States Patent
Dias et al.

(10) Patent No.: US 6,490,615 B1
(45) Date of Patent: Dec. 3, 2002

(54) SCALABLE CACHE

(75) Inventors: Daniel Manuel Dias, Mahopac, NY (US); Arun Kwangil Iyengar, Yorktown Heights, NY (US); Eric Michel Levy-Abegnoli, Nice (FR); Junehwa Song, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/196,944

(22) Filed: Nov. 20, 1998

(51) Int. Cl.[7] .................................................. G06F 15/16

(52) U.S. Cl. ........................ 709/219; 709/203; 709/226; 709/230

(58) Field of Search ................................ 709/217, 219, 709/230, 203, 226

(56) References Cited

U.S. PATENT DOCUMENTS

| | | | |
|---|---|---|---|
| 4,503,501 A | | 3/1985 | Coulson et al. |
| 5,809,250 A | | 9/1998 | Kisor |
| 5,842,216 A | | 11/1998 | Anderson et al. |
| 5,845,280 A | * | 12/1998 | Treadwell, III et al. ........ 707/8 |
| 5,915,088 A | * | 6/1999 | Basavaiah et al. ..... 709/200.28 |
| 5,987,510 A | * | 11/1999 | Imai et al. ................... 709/219 |
| 5,999,979 A | * | 12/1999 | Vellanki et al. ............. 709/232 |
| 6,012,126 A | * | 1/2000 | Aggarwal et al. .......... 711/133 |
| 6,122,666 A | * | 9/2000 | Beurket et al. ............. 709/226 |
| 6,212,565 B1 | * | 4/2001 | Gupta ........................ 709/229 |
| 6,263,402 B1 | * | 7/2001 | Ronstrom et al. .......... 711/131 |
| 6,341,311 B1 | * | 1/2002 | Smith et al. ................ 709/226 |
| 6,377,991 B1 | * | 4/2002 | Smith et al. ................ 709/226 |
| 2002/0026560 A1 | * | 2/2002 | Jordan et al. ............... 711/120 |

OTHER PUBLICATIONS

Ross, "Hash Routing for Collections of Shared Web Caches", IEEE Network, Nov./Dec. 1997, pp. 37–44.*
Wooster et al., "Proxy Caching That Estimates Page Load Delays", http://www.geckil.com/~harvest/mirror/de . . . ch/WWW6/Technical/Paper250/PAPER250.html, Apr. 1997, pp. 1–13.*
Malpani et al., "Making World Wide Web Caching Servers Cooperate", http://www.bmrc.berkeley.edu/research/publications/1995/138/paper–59.html, 1995, pp. 1–11.*

(List continued on next page.)

*Primary Examiner*—Dung C. Dinh
*Assistant Examiner*—Bradley Edelman
(74) *Attorney, Agent, or Firm*—F. Chau & Associates, LLP

(57) ABSTRACT

Requests for objects are received from one or more clients in a system comprised of a plurality of nodes. One of the requests is sent from one of the clients. The request is received from a first node of said plurality of nodes by a second node of said plurality of nodes. A requested object is returned from the second node of the plurality of nodes using one of a plurality of protocols. The method may be applied to a scalable and highly available cache array. The cache array may enhance the performance and throughput of Web servers connected to a network such as the Internet. A network dispatcher may send requests to a cache node of a cache array. The cache node selected by the network dispatcher may either serve the request, handoff the request to another cache node of a cache array, or communicate via one of a variety of protocols with another cache node of the cache array to cooperatively serve the request. A network dispatcher, operating in a special mode, may also function as a content based router. Thus, it is also possible for a network dispatcher to route requests using a combination of content-based and non-content-based routing in order to further improve system performance.

34 Claims, 9 Drawing Sheets

OTHER PUBLICATIONS

Hunt et al., Network dispatcher: A connection router for scalable Internet services, Apr. 1998, Computer Networks & ISDN Systems, vol. 30, Issue 1–7, pp. 347–357.*

Microsoft Proxy Server: CARP Whitepaper, printed Feb. 10, 1998, http://www.microsoft.com/proxy/guide/CarpWP.asp?A=2&B=3, pp. 1–8.*

Vivek S. Pai et al., "Locality–Aware Request Distribution in Cluster–based Network Servers", Proceedings of the Eighth International Conference on Architectural Support for Programming Languages and Operating Systems (ASPLOS–VIII), San Jose, CA, 10/98, pp. 1–12.

Daniel M. Dias et al., "A Scalable and Highly Available Web Server", Proceedings of Complon '96, 8 pages.

Guerney D. H. Hunt et al., "Network Dispatcher: a connection router for scalable Internet services", Seventh International World Wide Web Conference, 4/98, 16 pages.

Pei Cao et al., "Cost–Aware WWW Proxy Caching Algorithms", USENIX Symposium on Internet Technologies and Systems, 12/97, pp. 193–206.

J. Mogul et al., "Hypertext Transfer Protocol—HTTP/1.1", 1/97, pp. 1–159.

Nancy J. Yeager et al., "Web Server Technology", The Advanced Guide for World Wide Web Information Providers, 1996, 4 pages.

Marc Abrams et al., "Caching Proxies—Limitations and Potentials", Fourth International World Wide Web Conference Proceedings, 10/95, pp. 119–133.

Timos K. Sellist, "Intelligent Caching and Indexing Techniques for Relational Database Systems", Inform. Systems, vol. 13, No. 2, 1988, pp. 175–185.

Eric Levy et al., "Design and Performance of a Web Server Accelerator", IBM Research RC 21242 (94826), published 7/98 by the IBM Research Division, pp. 1–20.

* cited by examiner

SCALABLE CACHE

FIELD OF THE INVENTION

The present invention relates in general to a caching system. In particular, the present invention relates to a scalable and highly available cache in computer networks. Furthermore, the present invention relates to an array of caches used in a client/server environment such as, in particular, the World Wide Web.

BACKGROUND OF THE INVENTION

Caching is commonly used for improving performance on computer systems. Once an object is stored in a cache, subsequent requests for the cached object may be satisfied by the cache. Satisfying requests for an object from a cache may incur less overhead than regenerating or retrieving the object from a remote location. Slow performance coupled with a growing demand for Web services, may cause Web servers to become inefficient or unusable.

Caching offers a methodology for dealing with growing demands for greater throughput for Web and Proxy servers. Systems of clients and servers on the World Wide Web, for example, may use caching to improve performance. In some instances, Web server applications may perform slowly and inefficiently without the benefit of a cache. Without the benefit of a caching scheme, Web servers may become a system bottleneck. The underlying operating system running on a Web server, for example, may have performance problems impeding the throughput of the Web server. One technique for improving the performance of Web servers is to store frequently requested data (e.g. Web pages) in a cache. Retrieving data from the cache may require less overhead than retrieving the data from the Web server.

SUMMARY OF THE INVENTION

Requests for objects are received from one or more clients in a system comprised of a plurality of nodes. One of the requests is sent from one of the clients. The request is received from a first node of said plurality of nodes by a second node of said plurality of nodes. A requested object is returned from the second node of the plurality of nodes using one of a plurality of protocols.

BRIEF DESCRIPTION OF THE DRAWINGS

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included are the following figures.

DETAILED DESCRIPTION OF THE INVENTION

Glossary of Terms

Figure 1:
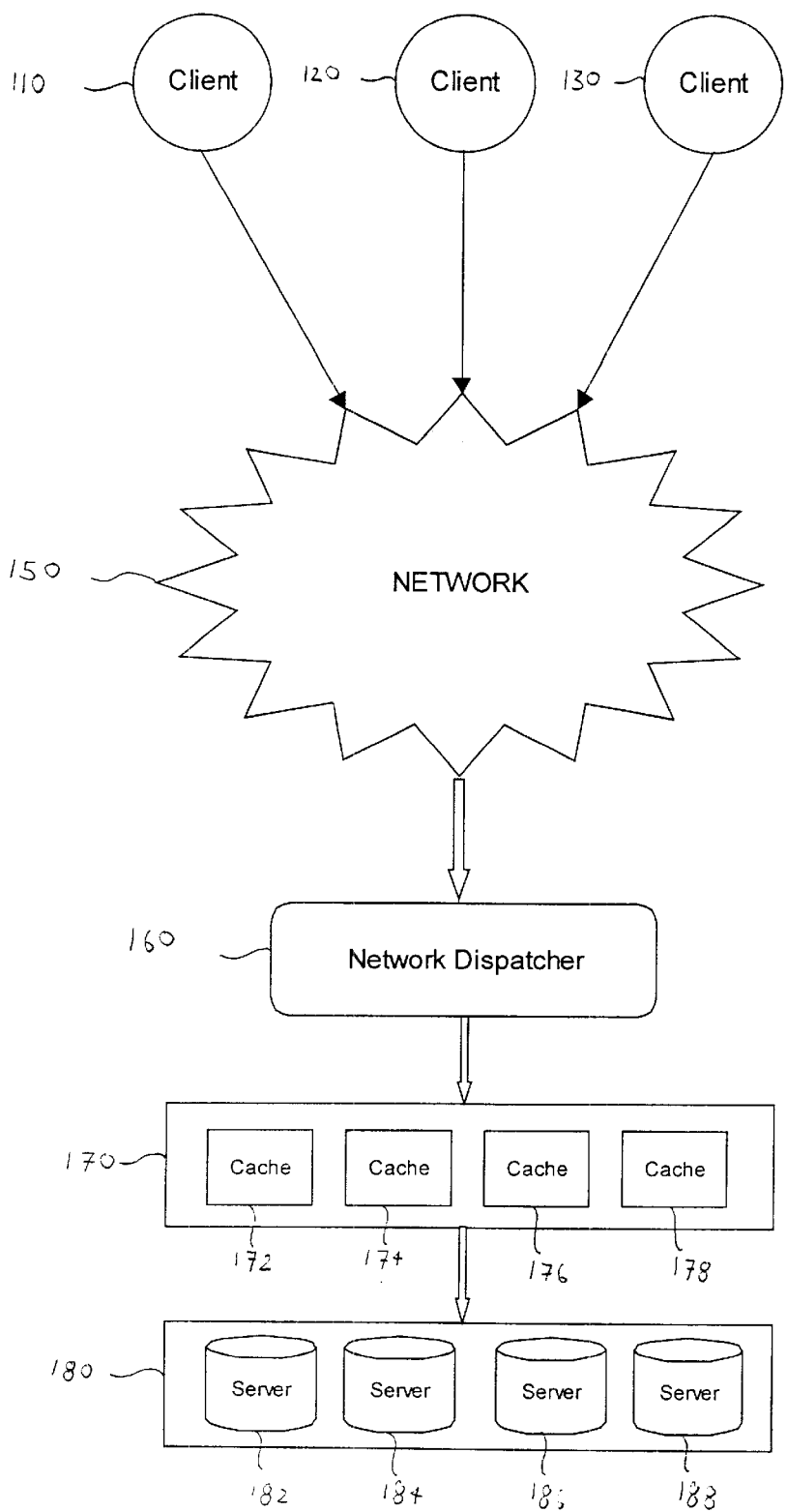
FIG. 1(a) is a block diagram is of an exemplary computer network system in accordance with an embodiment of the present invention.
FIG. 1(b) is a flowchart diagram of a method for retrieving a requested object in accordance with an exemplary embodiment of the present invention.

While dictionary meanings are also implied by terms used herein, the following definitions may also be helpful.

Client

A client computer which typically issues commands and/or requests to one or more servers which perform the task associated with the command and/or request.

Server

A server is a computer which performs a task at the command and/or request of one or more client computers.

World Wide Web (Web)

An Internet service that links documents by providing hyperlinks from server to server. Users may "jump" from document to document by clicking on highlighted words or phrases of interest (hypertext links), click on graphics such as applets or image maps, fill in forms, and enter URLs. User's may "jump" from document to document no matter where the documents are stored on the Internet. Internet Web servers support clients and provide information. Users "browse the Web" using Web client programs. The web may be considered as the Internet with resources addressed by URLs using HTTP protocols to transfer information between computers. HTML (among other formats) may be used to display information corresponding to URLs and provide point-and-click interface to other URLs.

Universal Resource Locator (URL)

An address for a resource on the Internet. URLs are used by Web browsers to locate Internet resources. A URL specifies the protocol to be used in accessing the resource (such as http: for a World Wide Web page or ftp: for an FTP site), the name of the server on which the resource resides (such as //www.whitehouse.gov), and, optionally, the path to a resource (such as an HTML document or a file on that server).

HyperText Markup Language (HTML)

The markup language used for documents on the World Wide Web. HTML is an application of SGML (Standard Generalized Markup Language) that uses tags to mark elements, such as text and graphics, in a document to indicate how Web browsers should display these elements to the user and should respond to user actions such as activation of a link by means of a key press or mouse click. HTML is a device-independent representation of content on Web servers. Web servers may deliver content (including hyperlinks) to clients in HTML with confidence that the client will choose an appropriate presentation.

HyperText Transfer Protocol (HTTP)

The client/server protocol used to access information on the World Wide Web. HTTP is an example of a stateless protocol. In other words, every request from a client to a server is treated independently. Clients send requests to servers and servers respond using this protocol.

User Datagram Protocol (UDP)

A connectionless protocol within TCP/IP that corresponds to the transport layer in the ISO/OSI model. UDP converts data messages generated by an application into packets to be sent via IP but may not verify that messages have been delivered correctly. Therefore, UDP may be more efficient than TCP, so it may be used for various purposes, including SNMP (Simple Network Management Protocol); the reliability may depend on the application that generates the message.

Router

An intermediary device on a communications network that expedites message delivery. On a single network linking many computers through a mesh of possible connections, a router receives transmitted messages and forwards them to their correct destinations over the most efficient available route. On an interconnected set of local area networks (LANs) using the same communications protocols, a router serves the somewhat different function of acting as a link between LANs, enabling messages to be sent from one to another.

Web Browser

A client application that enables a user to view HTML (or other) documents on the World Wide Web, another network, or the user's computer; follow the hyperlinks among them; and transfer files.

Transmission Control Protocol (TCP)

The protocol within TCP/IP that governs the breakup of data messages into packets to be sent via IP, and the reassembly and verification of the complete messages from packets received by IP. TCP corresponds to the transport layer in the ISO/OSI model.

Internet Protocol (IP)

The protocol within TCP/IP that governs the breakup of data messages into packets, the routing of the packets from sender to destination network and station, and the reassembly of the packets into the original data messages at the destination. IP corresponds to the network layer in the ISO/OSI model.

TCP/IP

A protocol developed by the Department of Defense for communications between computers. It is built into the UNIX system and has become the de facto standard for data transmission over networks, including the Internet.

Proxy Server

A component that manages Internet traffic to and from a local area network (LAN) and can provide other features, such as document caching and access control. A proxy server can improve performance by supplying frequently requested data, such as a popular Web page, and can filter and discard requests that the owner does not consider appropriate, such as requests for unauthorized access to proprietary files.

Cache

A special memory subsystem in which frequently used data values are duplicated for quick access.

Object

An object is data that may be stored in a cache, server, or client.

FIG. 1(a) illustrates an exemplary computer network system including: Clients 110, 120, and 130, network 150, network dispatcher 160, cache array 170, and server cluster 180. Cache array 170 includes cache nodes 172, 174, 176, and 178. Server cluster 180 includes servers ("back-end" servers) 182, 184, 186, and 188. Client computers 110, 120, and 130 issue requests for objects such as, for example, Web pages.

Figure 1B:
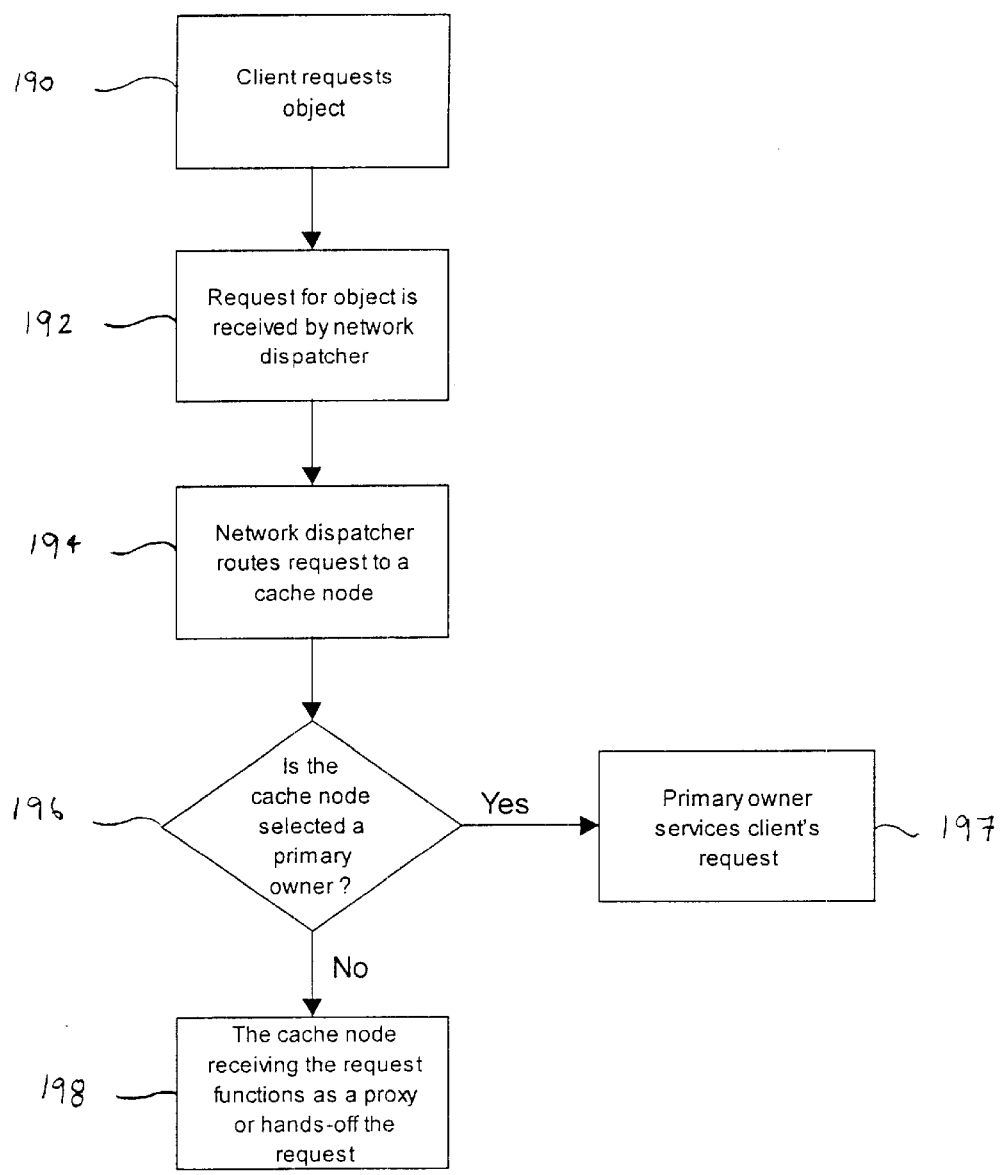

FIG. 1(b) is a flowchart diagram of a method for retrieving a requested object in accordance with an exemplary embodiment of the present invention. In step 190 a client, for example client 110, requests an object which may be stored (or generated or fetched by) a server, for example server 182. In step 192 the request for an object is received via a network, for example network 150, by a network dispatcher, for example network dispatcher 160. In step 194 network dispatcher 160 routes the request for the object to one cache node, for example cache node 172. In step 196 a determination is made whether cache node 172 receiving the request for the object from network dispatcher 160 in step 194, is a primary owner of the object. If cache node 172, receiving the request for the object from network dispatcher 160 in step 194, is the primary owner, then cache node 172 may service the client's request in step 197. Otherwise, in step 198 cache node 172 and the primary owner may either function as a proxy (e.g. through an HTTP or a UDP interface) to service the request and retrieve the requested object or cache node 172 may handoff the request to the primary owner. In steps 197 and 198 primary owner retrieves the requested object either from cache memory or by communicating with server 182. Note that one of ordinary skill in the art may modify the invention such that more than one cache node may be a primary owner of an object.

Clients 110, 120, and 130 may be workstations, personal computers, or other computers connected to the Internet. For example, a user using a personal computer at home may request to retrieve and view a Web page by inputting a corresponding URL using a Web browser. The requested Web page, addressed by the URL, may belong to a server accessible through Web services on the Internet.

Cache array 170 may be one or more network nodes. Each node included in cache array 170 may be one or more processors. Each processor of each node of cache array 170 may include a set of one or more cache members (cache nodes) which may form a single cache space and a single cache image. In other words, a client may view a cache array as a single image. For example, a client may access cache array 170 via an address associated with network dispatcher 160, but each node of cache array 170 may have an independent IP address. Internally a cache array may combine the resources of individual cache members. For example, cache space of cache members may be combined to scale the memory space available for caching. Further, the individual throughput of cache members may also be combined to scale the available throughput. Cache members 172, 174, 176, and 178 may each be addressable, internal to cache array 170, by a distinct address (e.g. an IP address). Cache nodes (members) 172, 174, 176, and 178 may be implemented, for example, by a router. A router such as, for example, an IBM 22XX family router may be used.

Network dispatcher 160 may be implemented, for example, on a TCP router. When network dispatcher 160 receives a request from a client such as, for example, client 110, network dispatcher may route the request to a cache node of cache array 170 without "looking" at the request. Network dispatcher 160 may be, for example, a service of a router node used to route client requests for Web pages (or other objects) to cache array 170. Network dispatcher 160 may obtain availability as well as load information about cache nodes 172, 174, 176, and 178 of cache array 170. Network dispatcher 160 may also route and transmit requests for objects to a selected cache node, based on the availability of cache nodes and/or load information (see, for example, G. Hunt et al., "Network Dispatcher: a connection router for scalable Internet Services," in Proceedings of the $7^{th}$ International World Wide Web Conference, April 1998).

A correspondence may be formed between cache nodes and requested objects. A requested object may correspond to a cache node which is a primary owner of the requested object as well as to other cache nodes. For example, Internet addresses expressed by URLs may be partitioned amongst Web cache nodes. For each URL, one Web cache node may be assigned as a primary owner. One or more Web cache nodes in addition to a primary owner may also correspond to a single URL. The URLs may be partitioned amongst Web cache nodes using, for example, a hashing function. In other words, a hashing function may be used to form a correspondence between cache nodes and requested objects.

When client 110, 120, or 130 issues a request to retrieve an object (i.e. a target object), the request is routed and transmitted by network dispatcher 160 to a first cache of cache array 170. A first-cache selected by network dispatcher 160 may or may not correspond to the requested object. In other words, the requested object may or may not be assigned to the first cache. If the first cache selected by network dispatcher 160 corresponds to the requested object (i.e. it is the primary owner of the requested object) and the requested object is stored in the first cache, then the first cache may service the request. If the first cache selected by network dispatcher 160 corresponds to the requested object (i.e. it is the primary owner of the requested object) and the requested object is not stored on the first cache, then the first cache may retrieve the requested object from an appropriate server 182, 184, 186, or 188 of server cluster 180.

For example, suppose a user, using a Web browser on a client, requests to retrieve and view a Web page. The requested Web page may be addressed by a URL and stored in a server connected to a network. Network dispatcher 160 selects a first cache node of cache array 170. Network dispatcher 160 routes the request for the Web page to the first cache node. If the requested Web page is stored in the first cache node, then the first cache node may retrieve the Web page from cache memory, and return the Web page to the client. If the first cache node is the primary owner of the requested Web page, but the Web page is not stored in the first cache node, then the first cache node may access the appropriate server, addressed by the URL, retrieve the Web page from the server, and return the Web page to the client.

If, however, the first cache selected by network dispatcher 160 does not correspond to the requested object (i.e. it is not the primary owner of the requested object), then the first cache may transmit the request to a second cache which does correspond to the requested object (i.e. the second cache is the primary owner of the requested object). The first cache and the second cache may communicate to service the request and retrieve the requested object. Alternatively, the first cache may handoff the request to the second cache. In the case of a handoff the request may be transmitted from the first cache to the second cache of cache array 170 along with information relating to a TCP connection (e.g. sequence numbers, IP addresses, and TCP ports).

A decision on whether the first cache and the second cache will communicate to service a request, or whether the first cache will handoff the request to the second cache may be made, for example, based on the size of the requested object.

For example, the following recipe may be followed:
1. If the size of the requested object is less than a threshold size, then the second cache transmits the requested object to the first cache. The second cache retrieves the requested object either from cache memory or by communicating with an appropriate server. The first cache may then service the request by transmitting the requested object to a requesting client.
2. If the size of the requested object is greater than a threshold size, then the first and second caches may coordinate to handoff the request:
   (i) the TCP connection is handed-off from the first cache to the second cache;
   (ii) network dispatcher 160 is informed that the request will be serviced by the second cache (note that network dispatcher 160 may also be informed that further requests for an object are to be transmitted to the second cache);
   (iii) the second cache retrieves the requested object either from cache memory or by communicating with an appropriate server, and transmits the requested object to a requesting client.

Note that the threshold size may be adjusted or varied dynamically.

In this type of exemplary coordination the second cache may have stored information fields useful for performing a TCP handoff (takeover) and/or an HTTP handoff (takeover). A first cache, initially receiving a request from network dispatcher 160, may wait until a second cache (primary owner of the requested object) transmits the requested object to the first cache, or informs the first cache that the second cache will service the request. Thus, the type of exemplary coordination described above may be driven by a primary owner of a requested object.

A cache member hit occurs when network dispatcher 160 forwards a connection request to a first cache which is the primary owner of a requested object. If, for example, network dispatcher 160 use a round-robin arrangement, the probability that a particular cache member will be selected may be uniformly distributed (i.e. probability 1/n, in the case of n cache members). In addition, network dispatcher 160 may access the addressing information (e.g. URL) associated with the requested object, but at a substantial overhead cost. Thus, network dispatcher 160 may access sufficient information to identify cache array 170 associated with server cluster 180, and then choose a cache member randomly. If load and availability information is provided to network dispatcher 160, the likelihood of selecting a particular cache may be weighted. In other words, if one cache is loaded, it may be selected less often, and the remaining cache members may be selected more often.

A cache array hit occurs when cache array 170 is able to service a request for an object from the cache space of one of cache member 172, 174, 176, 178. It is thus possible for a cache member hit to occur and cache array miss to occur simultaneously. For example, network dispatcher 160 may select a cache member which is the primary owner of the requested object, but the primary owner of the requested object does not have the requested object in cache memory. Hence, in case of a cache member hit and cache array miss, the primary owner retrieves the requested object from a server.

Further, a cache member miss and cache array hit may occur simultaneously. For example, network dispatcher 160 may select a cache member which is not the primary owner of a requested object, but the primary owner of the requested object, a cache member of cache array 170, does have the requested object in cache memory.

Therefore, the following four cases may occur:
1. Cache member hit, cache array hit
2. Cache member hit, cache array miss
3. Cache member miss, cache array hit
4. Cache member miss, cache array miss In addition, different communication protocols may be used to retrieve a requested object. Different protocols may be used depending on whether a first cache and a second cache communicate to service a request, or whether a first cache handsoff a request to a second cache. For example, an HTTP interface (where a first cache may act as an HTTP proxy), a UDP based request, or a handoff may be used.

The following eight cases may occur:
1. Cache member hit, cache array hit.
2. Cache member hit, cache array miss.
3. Cache member miss, cache array hits,
   3.1. object retrieved using HTTP,
   3.2. object retrieved using UDP, or
   3.3. object retrieved via a request handoff.
4. Cache member miss,. cache array miss,
   4.1. object retrieved using HTTP,
   4.2. object retrieved using UDP, or
   4.3. object retrieved via a request handoff.

Cache Member Hit

Figure 2:
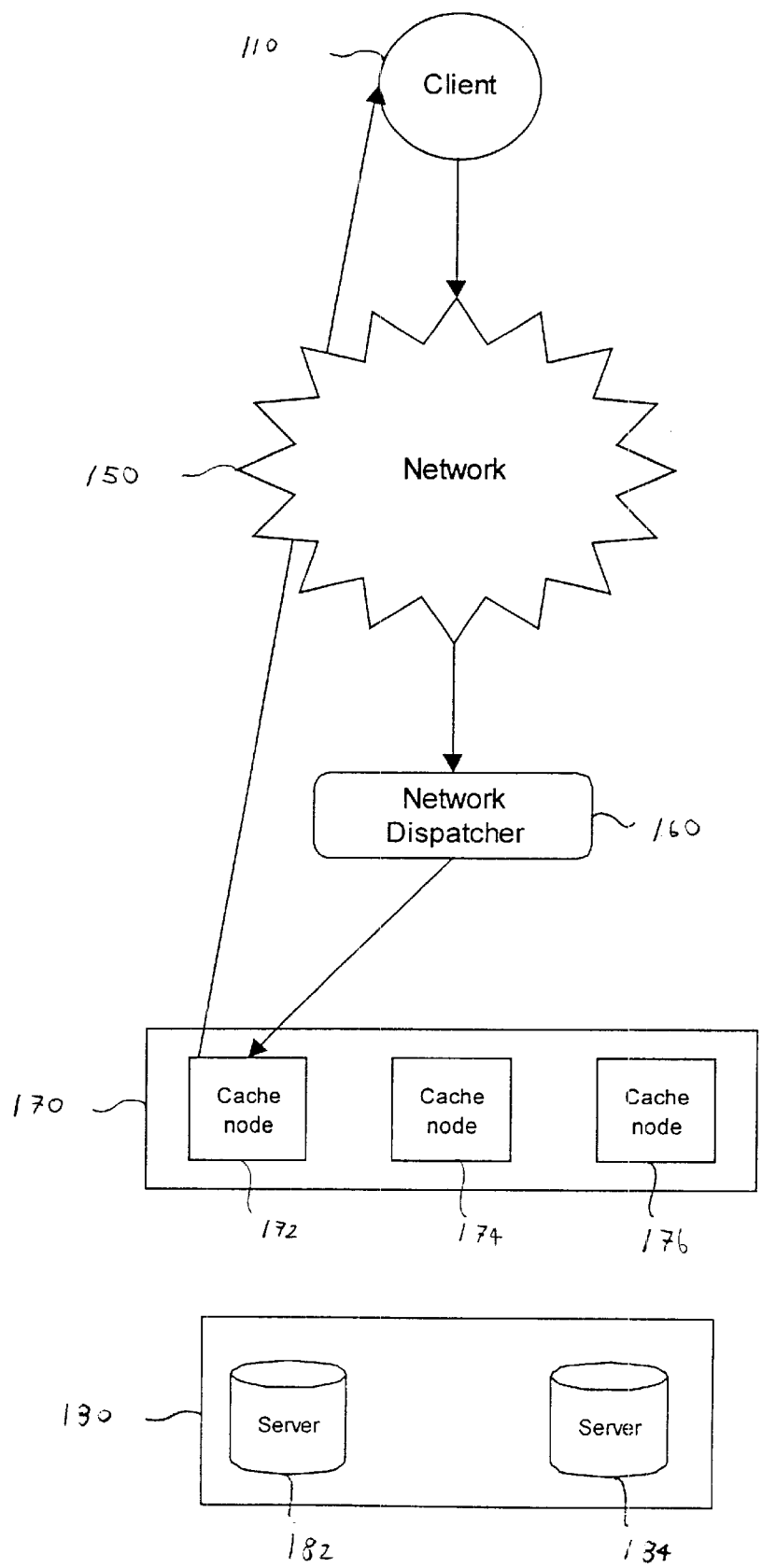
FIG. 2 is a block diagram which illustrates a method for retrieving a requested object in case of a cache member hit and a cache array hit in accordance with an exemplary embodiment of the present invention.
Figure 3:
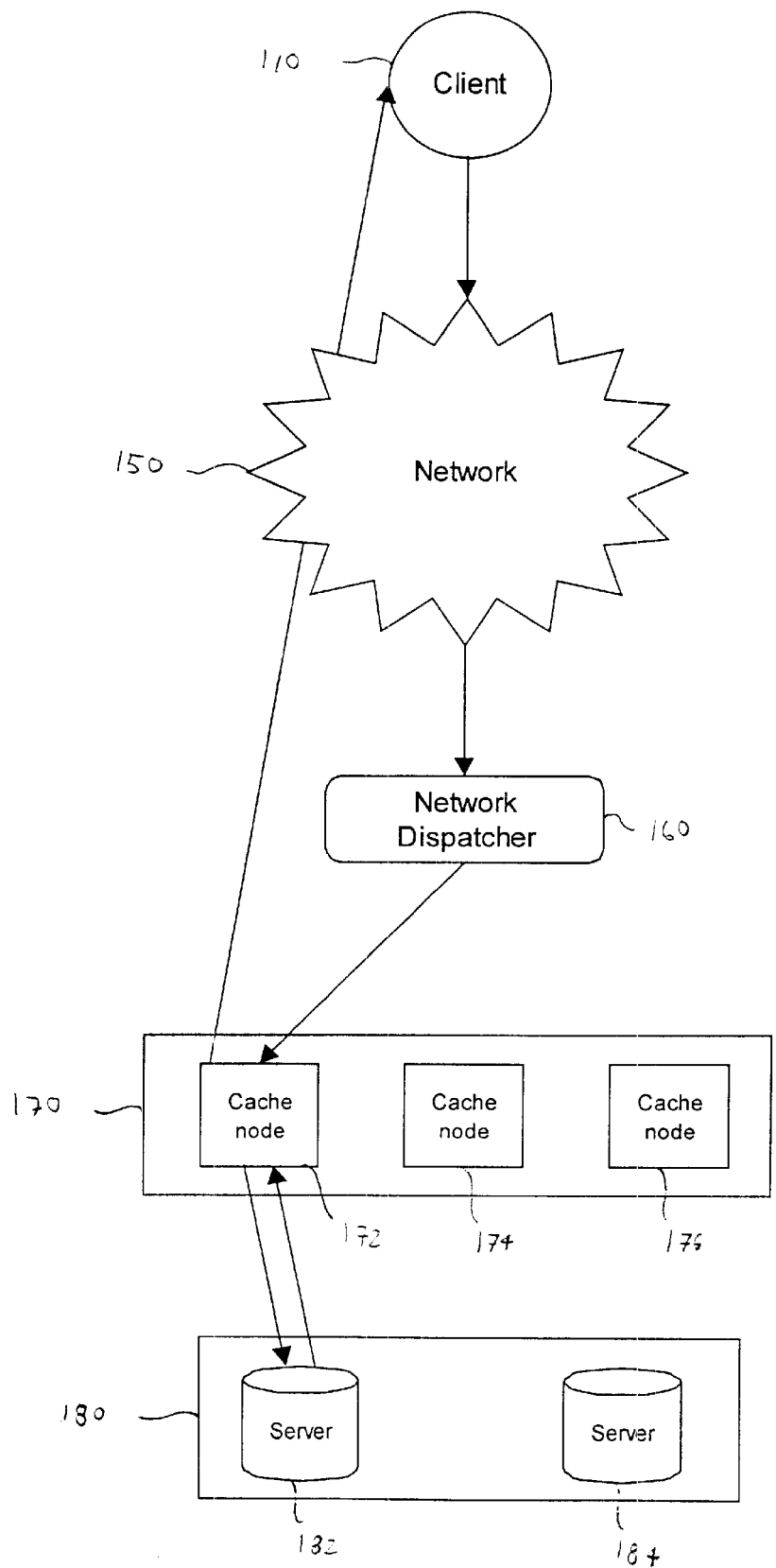
FIG. 3 is a block diagram which illustrates a method for retrieving a requested object in case of a cache member hit and a cache array miss in accordance with an exemplary embodiment of the present invention.

FIGS. 2 and 3 are block diagrams which illustrate a method for retrieving a requested object in case of a cache member hit in accordance with an exemplary embodiment of the present invention. Client 110 issues a request to retrieve an object via network 150. The requested object is stored on or may be generated or fetched by one of servers 182 and 184 of server cluster 180. The request issued by client 110 is forwarded via network 150 to network dispatcher 160. Network dispatcher 160 then selects a first cache, for example, cache member 172 of cache array 170. Supposing that first cache 172 selected by network dispatcher 160 is the primary owner of the requested object, a cache member hit occurs.

FIG. 2 illustrates the case where first cache 172 has the requested object in cache memory (cache array hit). In this case, first cache 172 may retrieve the requested object from cache memory and transmit the requested object to client 110 via network 150.

FIG. 3 illustrates the case where first cache 172 does not have the requested object in cache memory (cache array miss). In this case, first cache 172 may first retrieve the requested object from server 182, and then transmit the requested object to client 110 via network 150. System performance (e.g. overhead and throughput) for the case of cache member hit and cache array miss may decrease compared with the case of cache member hit and cache array hit.

Cache Member Miss—HTTP Interface

Figure 4:
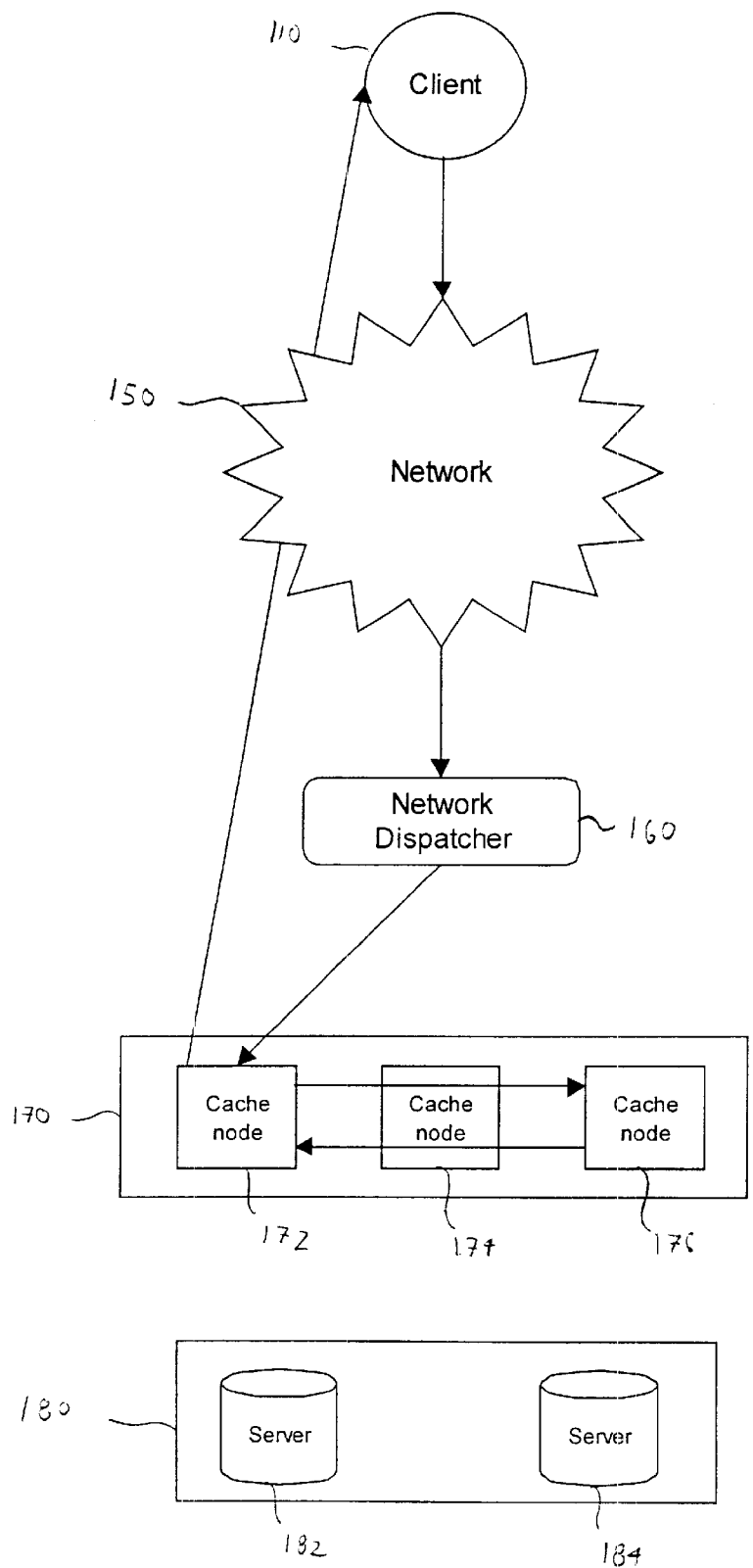
FIG. 4 through FIG. 7 are block diagrams which illustrate a method for retrieving a requested object in case of a cache member miss in accordance with an exemplary embodiment of the present invention.
Figure 5:
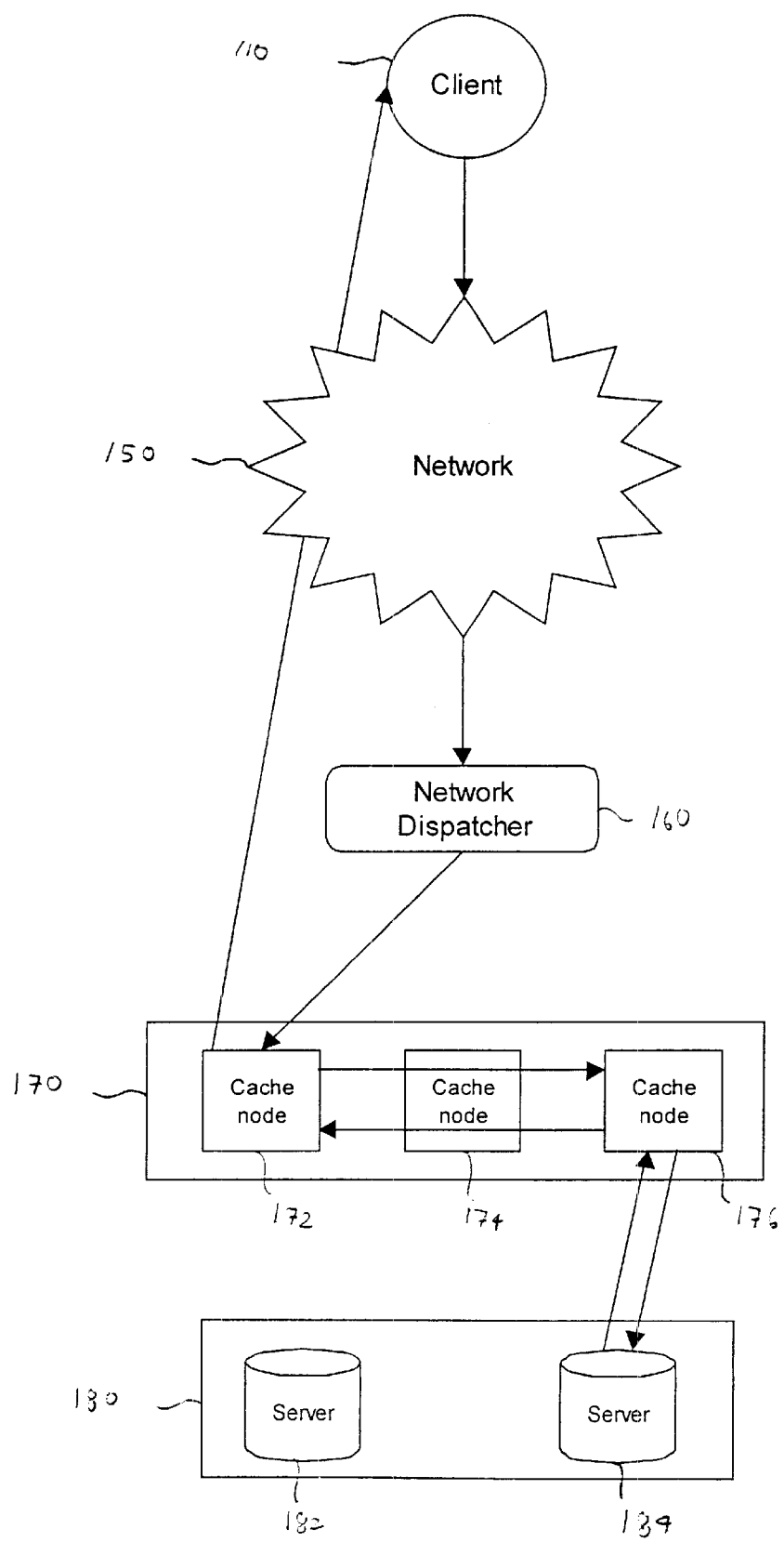

FIGS. 4 and 5 are block diagrams which illustrate a method for retrieving a requested object in case of a cache member miss in accordance with an exemplary embodiment of the present invention. Client 110 issues a request to retrieve an object via network 150. The requested object is stored on or may be generated or fetched by one of servers 182 and 184 of server cluster 180. The request issued by client 110 is forwarded via network 150 to network dispatcher 160. Network dispatcher 160 then selects a first cache, for example, cache member 172 of cache array 170. Supposing that first cache 172 selected by network dispatcher 160 is not the primary owner of the requested object, a cache member miss occurs. Note that in case network dispatcher 160 randomly selects (with uniform distribution) a first member of cache array 170 (with n cache members), the probability of a cache member miss is (n−1)÷n.

FIG. 4 illustrates the case where a second cache, for example, cache member 176, is the primary owner of the requested object, and cache member 176 has the requested object in cache memory (cache array hit). In this case, first cache 172 may accept a connection with client 110. First cache 172 may then identify second cache 176 and establish an HTTP interface. First cache 172 and second cache 176 may communicate to retrieve the requested object via an HTTP interface. Second cache 176 may retrieve the requested object from cache memory and transmit the requested object to first cache 172. First cache 172 may then transmit the requested object to client 110 via network 150.

FIG. 5 illustrates the case where second cache 176 does not have the requested object in cache memory (cache array miss). In this case, second cache 176 may first retrieve the requested object from server 184, and then transmit the requested object to first cache 172. First cache 172 may then transmit the requested object to client 110 via network 150.

Cache Member Miss—UDP Interface

FIG. 4 illustrates the case where a second cache, for example, cache member 176, is the primary owner of the requested object, and cache member 176 has the requested object in cache memory (cache array hit). In this case, first cache 172 may accept a connection with client 110. First cache 172 may then identify second cache 176 and establish an UDP interface. First cache 172 and second cache 176 may communicate to retrieve the requested object via an UDP interface. Second cache 176 may retrieve the requested object from cache memory and transmit the requested object to first cache 172. First cache 172 may then transmit the requested object to client 110 via network 150.

FIG. 5 illustrates the case where second cache 176 does not have the requested object in cache memory (cache array miss). In this case, second cache 176 may first retrieve the requested object from server 184, and then transmit the requested object to first cache 172. First cache 172 may then transmit the requested object to client 110 via network 150.

A UDP interface may have better performance than an HTTP interface because a UDP interface may avoid a TCP connection having concomitant overhead.

Cache Member Miss—Handoff Interface

Figure 6:
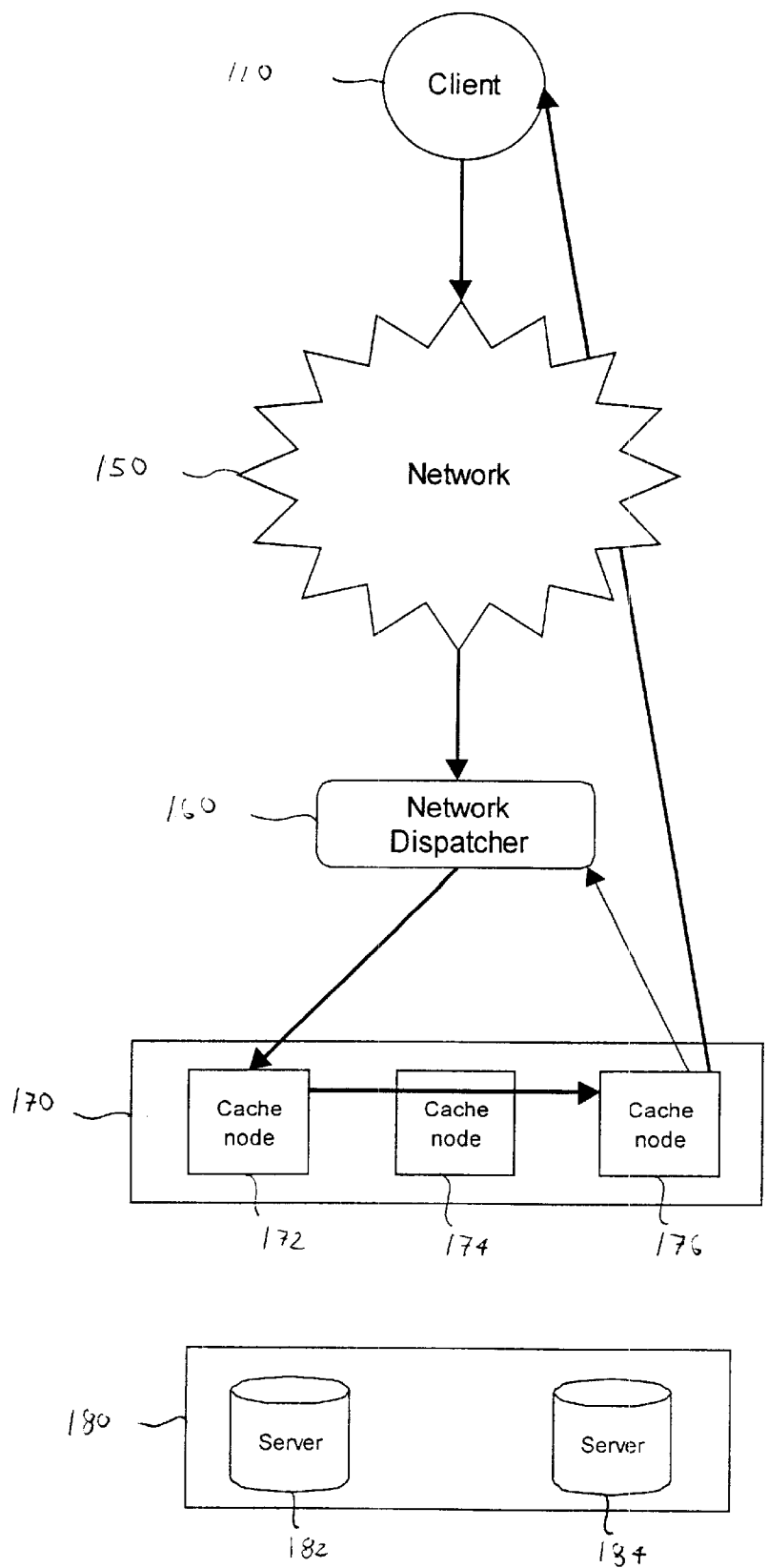
Figure 7:
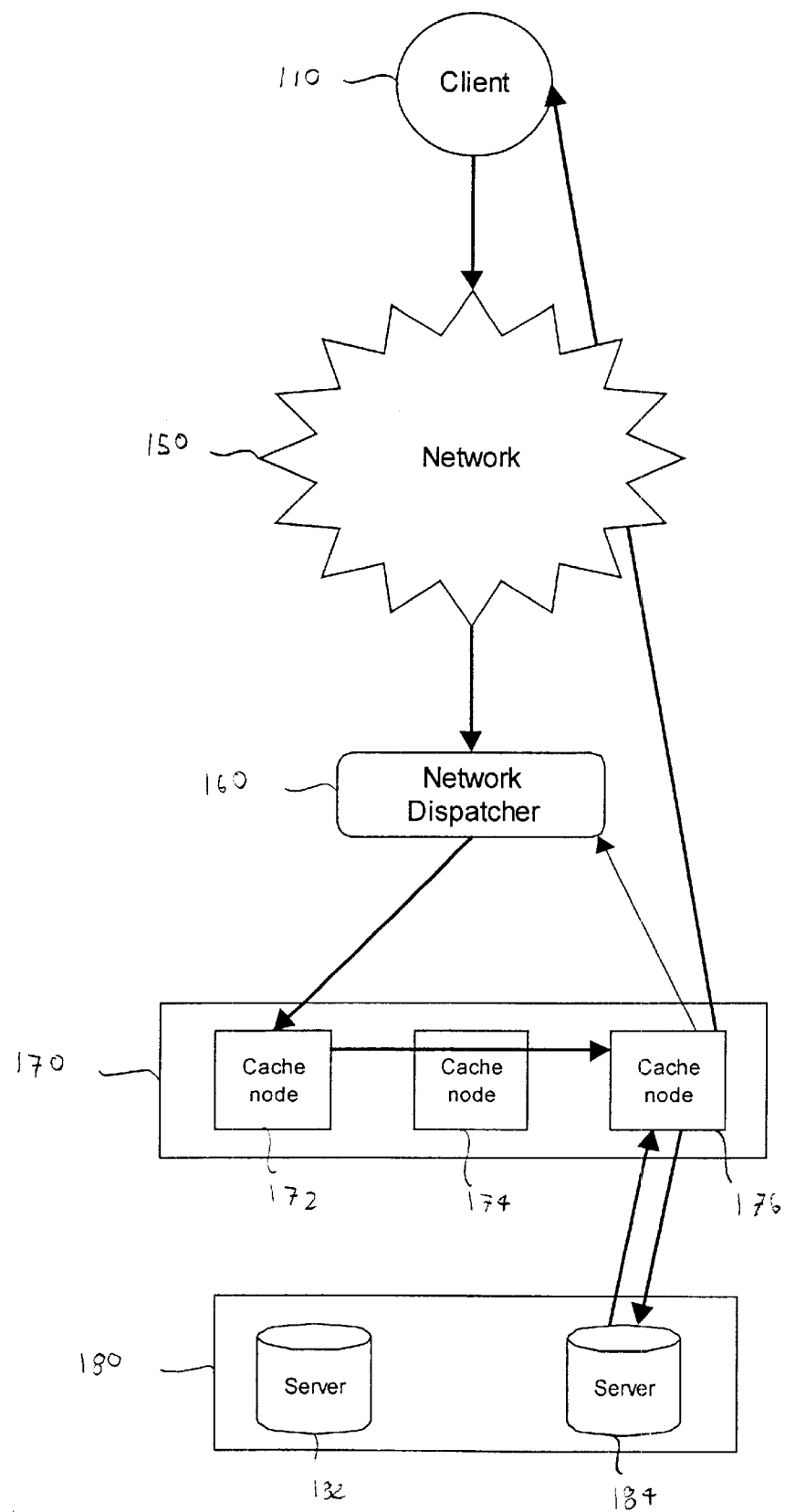

FIGS. 6 and 7 are block diagrams which illustrate a method for retrieving a requested object in case of a cache member miss in accordance with an exemplary embodiment of the present invention. Client 110 issues a request to retrieve an object via network 150. The requested object is stored on or may be generated or fetched by one of servers 182 and 184 of server cluster 180. The request issued by client 110 is forwarded via network 150 to network dispatcher 160. Network dispatcher 160 then selects a first cache, for example, cache member 172 of cache array 170. Supposing that first cache 172 selected by network dispatcher 160 is not the primary owner of the requested object, a cache member miss occurs.

FIG. 6 illustrates the case where a second cache, for example, cache member 176, is the primary owner of the requested object, and cache member 176 has the requested object in cache memory (cache array hit). In this case, first cache 172 performs a handoff of the request (e.g. along with a TCP connection) to second cache 176. Second cache 176 may then retrieve the requested object from cache memory and transmit the requested object to client 110.

FIG. 7 illustrates the case where second cache 176 does not have the requested object in cache memory (cache array miss). In this case, first cache 172 performs a handoff of the request (e.g. along with a TCP connection) to second cache 176. Second cache 176 may first retrieve the requested object from server 184, and then transmit the requested object to client 110.

Cache array 170 may be equipped with several features which support a handoff interface. First, all cache members of cache array 170 may be addressed using one cluster address (e.g. one IP address). Thus, first cache 172 and second cache 176 may both accept requests corresponding to the cluster address, and respond to client 110. Second, a mechanism such as, for example, a TCP kernel extension, may be provided to allow a handoff from first cache 172 (using one TCP stack) to second cache 176 (using a second TCP stack). During the handoff, a UDP interface between first cache 172 and second cache 176 may be used to transfer connection information. The use of a UDP interface may help to improve performance. Third, along with TCP interface capabilities an additional mechanism for handing-off HTTP requests from first cache 172 to second cache 176 may be implemented. Fourth, network dispatcher 160 may be used to support TCP handoffs. When a TCP/HTTP connection is handed-off from first cache 172 to second cache 176, it may be desirable to ensure that the connection flow (from client to server) passes through second cache 176 (the new owner of the connection). Either first cache 172 or second cache 176 may direct network dispatcher 160 to update its information so that subsequent packets are sent to second cache 176, instead of first cache 172.

Overhead for a handoff interface may be higher than in the case of a UDP interface. In the case of a UDP or HTTP interface, however, performance may substantially decrease with increasing object size. Unlike the case of a UDP or HTTP interface, performance for a handoff interface may be less sensitive to increases in object size. The sensitivity of performance for a handoff interface to an increase in object size may be similar to the sensitivity of performance to an increase in object size for the case of a cache member hit. Therefore, performance may be improved by using a handoff interface for relatively large objects, and a UDP, HTTP, or other interface for relatively small objects.

Cache Member Miss—a Mixed Model

The type of interface used (e.g. UDP or handoff) may be chosen based on the size of a requested object. A size threshold may be determined such that improved performance may result by using one type of interface (e.g. UDP) for an object which is smaller than the size threshold, and another type of interface (e.g. handoff) for an object which is larger than the size threshold. A size threshold may be determined, for example, from measuring the throughput of a given computer network and system.

For example, a UDP interface may be chosen for requested objects which are smaller than 2 Kbytes, and a handoff interface may be chosen for requested objects which are larger than 2 Kbytes. Referring, for example, to FIG. 1(*a*), suppose client 110 requests an object which is stored on or may be generated or fetched by server 186. Suppose further that cache member 178 is the primary owner of the requested object. The following exemplary recipe may be applied:

1. First cache, say cache member 172, selected by network dispatcher 160, may send second cache 178 a request and, for example, TCP connection information.

2. Second cache 178 may determine the size of the requested object. The size of the requested object may be determined either from cache memory or by contacting server 186 in case the object is not in cache memory.

3. If the size of the requested object is less than a size threshold, second cache 178 may transmit the requested object to first cache 172. First cache 172 may then transmit the requested object to client 110.

4. If the size of the requested object is greater than a size threshold, a handoff, for example a TCP/HTTP handoff, between first cache 172 and second cache 178 may be performed. Second cache 178 may then retrieve the requested object either from cache memory or from server 186, and transmit the requested object to client 110.

Content Based Routing

Figure 8:
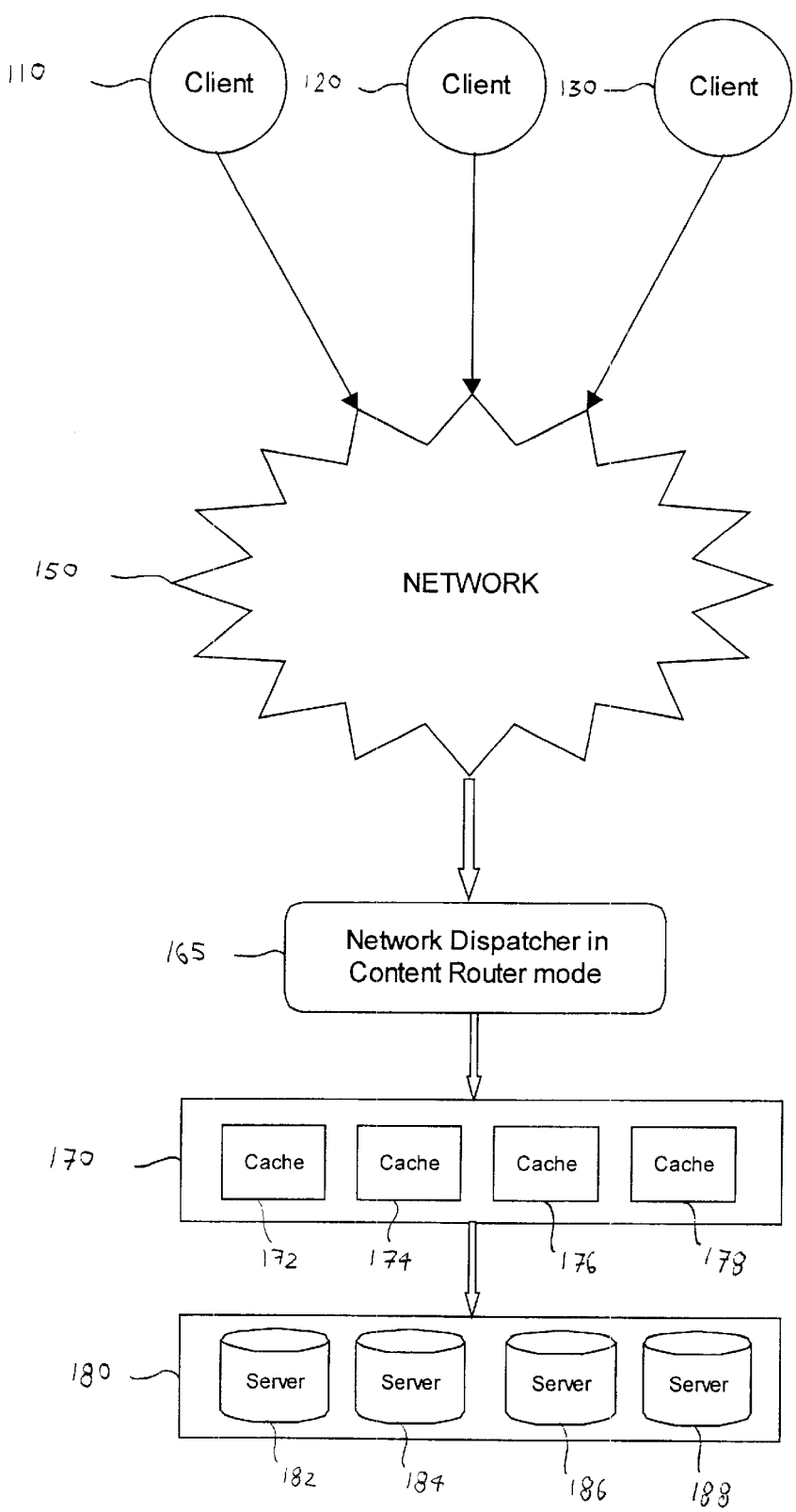
FIG. 8 is a block diagram which illustrates a method for retrieving a requested object in the case of content based routing in accordance with an exemplary embodiment of the present invention.

In this case, network dispatcher 160 of FIG. 1(*a*), may function as content based router 165 of FIG. 8. In particular, a network dispatcher such as, for example, network dispatcher 160 of FIGS. 2–7 operating in a special mode, may function as content based router 165. Addresses for requested objects (e.g. URLs) may be partitioned amongst cache nodes 172, 174, 176, and 178 of cache array 170 using, for example, a hashing function. In other words, a hashing function may be used to form a correspondence between cache nodes and requested objects. The address of a requested object may be hashed. The output of the hashing function may be a cache node associated with one or more servers which may generate or fetch a requested object or on which a requested object is stored. In other words, the output of the hashing function may be a cache member that is the primary owner of a requested object. This is not necessarily to imply that there is a special relationship between a cache node and a server. Although, optionally, one such relationship may exist.

When a client, such as clients 110, 120, and 130, requests the retrieval of an object, content based router 165 may perform a handoff of the request along with, for example, TCP connection information, to a cache node selected by content based router 165. The cache node selected by content based router 165 is the primary owner of the requested object. The selected cache node may then retrieve the requested object either from cache memory or from a server with which it is associated, and transmit the requested object to a requesting client via network 150.

As a network dispatcher, operating in a special mode, may function as a content based router, it is possible for a network dispatcher to route requests using a combination of content-based and non-content-based routing. When content-based routing is used, network dispatcher 160 operating as content based router 165 may examine a request sent by a client to determine which cache node is a primary owner of a requested object. As content based routing avoids cache member misses, content based routing may reduce processor cycles spent by the cache array. Content based routing, however, may increase consumption of processor cycles by network dispatcher 160 operating as content based router 165. More processor cycles may be consumed by network dispatcher 160 operating in content based routing mode because network dispatcher 160 establishes a connection with a client.

It may be advantageous to use content based router 165, as long as it does not become a system bottleneck. For example, a content based router implemented by an IBM 2216 router may not become a bottleneck as long as fewer than 10K requests/sec are made. If, however, more than 10K requests/sec are made (statically or dynamically) then it may be advantageous for an IBM 2216 router to act as a network dispatcher. Alternatively, a content based router having an integrated cache may be used. At relatively low and intermediate system loads, a content based router may serve requests using an integrated cache. At relatively high system loads such a router may resume the functionality of a network dispatcher.

For example, an IBM 2216 router is capable of routing approximately 15,000 requests per second as a network dispatcher. An IBM 2216 router acting as a cache node is capable of serving approximately 5,000 objects per second at nearly 100% cache rate. An IBM 2216 router acting as a content based router with handoff is able to serve approximately 5,000/0.5=10,000 requests a second.

In a variation of the above exemplary embodiments of the present invention illustrated, for example, in FIGS. 2–7, a certain percentage of requests routed by network dispatcher 160 to cache array 170 may be performed in content-based routing mode. Content-based routing may incurs less overhead on cache array 170 but more overhead at network dispatcher 160. The percentage of requests for which content-based routing is used may be selected to balance utilization of network dispatcher and cache array resources. A further variation may be to increase a percentage of requests which are routed using content-based routing mode in response to cache array 170 becoming a bottleneck. In response to network dispatcher 160 becoming a bottleneck, however, the percentage of requests which are routed using content-based routing mode may be decreased.

Note that, optionally, the functionality of a network dispatcher, such as, for example network dispatcher 160 of FIG. 1(*a*), may be integrated into a cache node.

One of ordinary skill in the art may conceive of adaptations of the above exemplary embodiments. For example, a client request need not be directed by a first node to a primary owner of a partition to which a requested object belongs. If a primary owner is overloaded, a request may be sent to a second node. A second node may return a requested object to a first node, or a second node may return a requested object directly to a client using handoff. Optionally, a request may be handed-off to a server node.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. In a system adapted to receive request for objects from one or more clients, said system comprised of a plurality of cache nodes, a method for retrieving a requested object of said objects, said method comprising the steps of:
   (a) sending one of said requests from one of said clients;
   (b) receiving said request at a network dispatcher;
   (c) forwarding said request from said network dispatcher to a cache node, selected by said network dispatcher, of a cache array, wherein one cache node of said cache array is a primary owner of said requested object; and
   (d) returning said requested object from a servicing cache node of said cache array using one of a plurality of protocols, wherein said one of the plurality of protocols is selected by the cache array based on the size of said requested object.

2. The method of claim 1, wherein said one node receives said request from said one of said clients.

3. The method of claim 1, wherein said one node receives said request from another of said plurality of nodes.

4. The method of claim 1, wherein in response to the size of said requested object being less than a predetermined size the requested object is returned from another cache node to said one node and subsequently from said one node to said one of said clients.

5. The method of claim 4, wherein said requested object is returned from said one node to at least a further node of said plurality of nodes before being returned to said one of said clients.

6. The method of claim 1, wherein in response to the size of said requested object being greater than a predetermined size the requested object is returned from another cache node to said one of said clients without first passing through said one node.

7. The method of claim 6, wherein said requested object is returned from said another node to at least a further node of said plurality of nodes before being returned to said one of said clients.

8. The method of claim 1, wherein one of said plurality of nodes functions as a back-end server.

9. The method of claim 8, further comprising the step of sending said request to the back-end server in response to said cache array not having a cached copy of said requested object.

10. The method of claim 1, further comprising the step of partitioning the ownership of one of said objects across one of said plurality of nodes.

11. The method of claim 10, wherein another node is said primary owner of said requested object and is selected as the servicing node.

12. The method of claim 10, wherein any one of said objects has at most one owner.

13. The method of claim 10, wherein any one of said objects has multiple owners.

14. The method of claim 1, wherein the one of the plurality of protocols is one of HTTP (HyperText Transfer Protocol), UDP (User Datagram Protocol), and Handoff interface.

15. The method of claim 1, wherein one of said plurality of nodes functions as a back-end server.

16. The method of claim 15, further comprising the step of sending said request to the back-end server in response to said cache array not having a cached copy of said requested object.

17. A method of retrieving a requested object, said method comprising the steps of:
   (a) transmitting a request for the requested object to a cache array comprising a plurality of caches including a first cache and having a single cache image;
   (b) determining whether the first cache corresponds to the requested object;
   (c) identifying a second cache in the cache array corresponding to the requested object; and
   (d) retrieving the requested object via the second cache using one of a plurality of protocols, wherein said one of the plurality of protocols is selected by the cache array based on the size of said requested object.

18. The method according to claim 17, wherein the requested object is retrieved by transmitting the requested object from the second cache to the first cache and from the first cache to a client.

19. The method according to claim 17, wherein the request for the requested object is forwarded from the first cache to the second cache.

20. The method according to claim 19, wherein the requested object is retrieved by transmitting the requested object from the second cache to a client.

21. The method according to claim 20, further comprising the steps of:
   determining whether the requested object is not stored in the second cache; and
   retrieving the requested object from a server associated with the second cache.

22. The method according to claim 17, wherein steps (c) and (d) are performed if in step (b) it is determined that the first cache does not correspond to the requested object.

23. The method according to claim 17, wherein the one of the plurality of protocols is one of HTTP (HyperText Transfer Protocol), UDP (User Datagram Protocol), and Handoff interface.

24. A method of retrieving a target object of a plurality of objects, the target object requested by a client, said method comprising the steps of:

(a) assigning each of the plurality of objects to at least one of a plurality of nodes;

(b) assigning at least one of a plurality of caches to each of the plurality of nodes;

(c) transmitting a request for the target object to a first node of the plurality of nodes;

(d) determining if the target object is assigned to the first node; and (e) if the target object is not assigned to the first node
  (i) transmitting the request to a second node of the plurality of nodes, the target object being assigned to the second node, and
  (ii) retrieving the target object from a cache of the plurality of caches assigned to the second node if the target object is stored in the cache assigned to the second node using one of a plurality of protocols, wherein said one of the plurality of protocols is selected by the cache array based on the size of said requested object.

25. The method according to claim 24, wherein step (ii) is performed by communicating via at least one of the plurality of protocols.

26. The method according to claim 25, further comprising the step of if the target object is not assigned to the first node and if the size of the target object is smaller than a predetermined object size, transmitting the target object from the second node to the first node, and transmitting the target object from the first node to the client.

27. The method according to claim 25, further comprising the step of if the target object is not assigned to the first node and if the size of the target object is larger than a predetermined object size, transmitting the target object from the second node to the client.

28. The method according to claim 25, wherein a first protocol of the plurality of protocols is executed between the first node and the second node, and a second protocol of the plurality of protocols is executed between the first node and the client.

29. The method according to claim 25, wherein a first protocol of the plurality of protocols is executed between the second node and the client.

30. The method according to claim 24, further comprising the step of
  if the target object is assigned to the first node, retrieving the target object from a cache of the plurality of caches assigned to the first node if the target object is stored in the cache assigned to the first node.

31. The method according to claim 30, further comprising the step of
  retrieving the target object from a server corresponding to the first node if the target object is not stored in the cache assigned to the first node.

32. The method according to claim 24, wherein step (e) the target object is retrieved from a server corresponding to the second node if the target object is not stored in the cache assigned to the second node.

33. An article of manufacture comprising a computer usable medium having computer readable code means embodied therein for receiving a request for an object, said system comprised of a plurality of cache nodes, the computer readable program code means in said article of manufacture comprising computer readable program code means for causing a computer to effect:

(a) sending one of said requests from one of said clients;

(b) receiving said request at a network dispatcher;

(c) forwarding said request from said network dispatcher to a cache node, selected by said network dispatcher, of a cache array, wherein one cache node of said cache array is a primary owner of said requested object; and (d) returning said requested object from a servicing cache node of said cache array using one of a plurality of protocols, wherein said one of the plurality of protocols is selected by the cache array based on the size of said requested object.

34. A program storage device readable by machine, tangibly embodying a program of instructions executable by the machine to perform method steps for retrieving a requested object of a plurality of objects in a system adapted to receive requests for said objects from one or more clients, said system comprised of a plurality of cache nodes, said method steps comprising:

(a) sending one of said requests from one of said clients;

(b) receiving said request at a network dispatcher;

(c) forwarding said request from said network dispatcher to a cache node, selected by said network dispatcher, of a cache array, wherein one cache node of said cache array is a primary owner of said requested object; and (d) returning said requested object from a servicing cache node of said cache array using one of a plurality of protocols, wherein said one of the plurality of protocols is selected by the cache array based on the size of said requested object.

* * * * *